United States Patent
Teich et al.

(10) Patent No.: US 7,796,352 B2
(45) Date of Patent: Sep. 14, 2010

(54) DEVICE FOR RAPIDLY CHANGING OBJECTIVES WITH THE AID OF THREADED FASTENING

(75) Inventors: Michael Teich, Moritzburg OT Friedewald (DE); Mirko Kreher, Grossenhain (DE)

(73) Assignee: Cascade Microtech Dresden GmbH, Thiendorf (DE)

( * ) Notice: Subject to any disclaimer, the term of this patent is extended or adjusted under 35 U.S.C. 154(b) by 363 days.

(21) Appl. No.: 11/947,163

(22) Filed: Nov. 29, 2007

(65) Prior Publication Data

US 2008/0186602 A1    Aug. 7, 2008

(30) Foreign Application Priority Data

Feb. 2, 2007    (DE) .................. 10 2007 006 066

(51) Int. Cl.
*G02B 7/02*    (2006.01)
(52) U.S. Cl. .................. 359/828; 359/829; 359/830; 359/811
(58) Field of Classification Search ......... 359/694–701, 359/819–824, 828–830
See application file for complete search history.

(56) References Cited

U.S. PATENT DOCUMENTS

| 3,758,198 | A  |   | 9/1973  | Kanie ........................ 359/828 |
| 6,286,963 | B1 | * | 9/2001  | Nelson ....................... 359/506 |
| 6,421,192 | B2 | * | 7/2002  | Nomura et al. ............. 359/828 |
| 6,476,978 | B2 | * | 11/2002 | Takahashi ................... 359/704 |
| 7,046,462 | B2 | * | 5/2006  | de Winter ................... 359/829 |
| 7,372,638 | B2 | * | 5/2008  | Yoshii et al. ................ 359/699 |

FOREIGN PATENT DOCUMENTS

DE    2218195    10/1972

* cited by examiner

*Primary Examiner*—Mohammed Hasan
(74) *Attorney, Agent, or Firm*—Heslin Rothenberg Farley & Mesiti P.C.

(57) ABSTRACT

A device for rapidly changing objectives with threaded fastening on an optical instrument comprises an instrument adaptor which has, at one end, an external thread corresponding to the external thread of the objective, and, at the other end, a bayonet mount for fixably holding a bayonet base, and an objective adaptor which has, at one end, a bayonet base which can be connected to the bayonet mount of the instrument adaptor, and, at the other end, an internal thread corresponding to the internal thread of the optical instrument.

7 Claims, 1 Drawing Sheet

DEVICE FOR RAPIDLY CHANGING OBJECTIVES WITH THE AID OF THREADED FASTENING

CROSS REFERENCE TO RELATED APPLICATIONS

Figure 1:
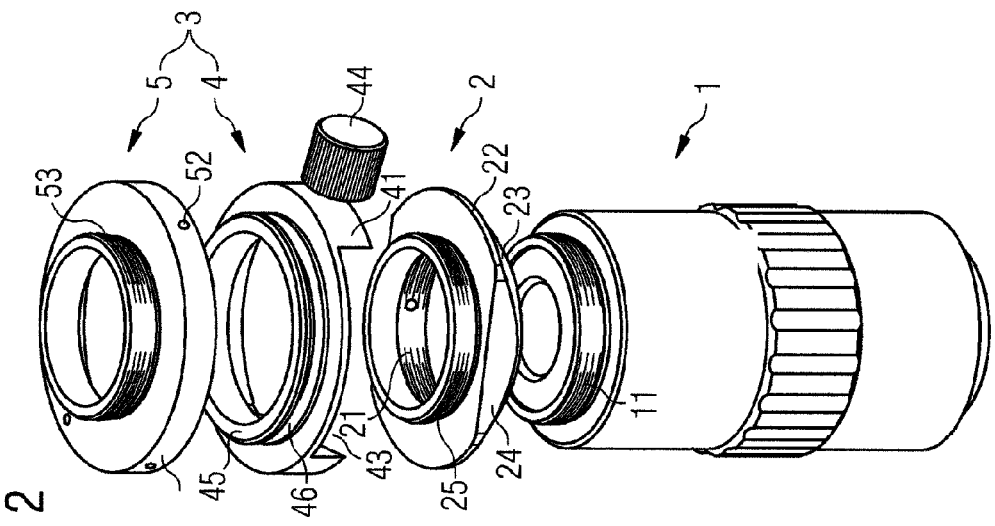

This application claims priority of German application No. 10 2007 006 066.3 filed on Feb. 2, 2007, the entire disclosure of which is hereby incorporated herein by reference.

BACKGROUND ART

The invention relates to a device for rapidly changing objectives with the aid of threaded fastening.

In the case of microscopes, such as are used, for example, to inspect semiconductor components, a thread is used in many cases to connect the objective to the microscope. It is therefore generally relatively complicated to change the objective, and to do so is possible only using both hands, as a rule. In practice, however, the necessity often arises of interchanging one objective for another. The object of the present invention therefore consists in specifying a device which in the case of a microscope with a threaded connection for the objective substantially simplifies the interchange of the objective and greatly shortens the time required for the interchange.

BRIEF SUMMARY OF INVENTION

The inventive device for removably fitting an objective with an external thread on a corresponding internal thread of an optical instrument comprises an instrument adaptor which at one end has an external thread corresponding to the external thread of the objective, and at the other end, a bayonet mount for fixably holding a bayonet base, an objective adaptor which has at one end a bayonet base which can be connected to the bayonet mount of the instrument adaptor, and at the other end an internal thread corresponding to the internal thread of the optical instrument. One advantage of the inventive device consists in that the instrument adaptor and the objective adaptor can be easily separated from one another such that the objective adaptor can remain on the objective when the objective is not required and be kept in a transport container. In the same way the instrument adaptor can always remain on the microscope irrespective of which objective is currently being used. The user of the inventive device need only screw the instrument adaptor on to the microscope and screw one objective adaptor each on to each objective that is to be used with the microscope. Consequently, there is no need at all for parts to be screwed to one another. The interchange of an objective on the microscope is performed in a simple way by connecting the bayonet base of the objective adaptor to the bayonet mount of the instrument adaptor. This connection can be produced with one hand.

It is provided in a development of the invention that the instrument adaptor comprises a mounting ring, having the external thread and a coupling ring, having the bayonet mount, the mounting ring and coupling ring being rotatable relative to one another about the longitudinal axis of the instrument adaptor and being fixable in a selectable position.

This bipartite design of the instrument adaptor can be configured so that, on the side opposite the external thread, the mounting ring has a mount for rotatably and fixably holding a base, and on the side opposite the bayonet mount, the coupling ring has a base which can be inserted into the mount of the mounting ring and can be locked in the longitudinal direction of the instrument adaptor.

It is provided in one refinement that the base of the coupling ring has a circumferential groove and the mount of the mounting ring has at least one fixing element which can be brought into engagement with the groove. The fixing element can be, for example, a threaded pin.

The connection between the instrument adaptor and the objective adaptor is effected by the collaboration of the bayonet mount and the bayonet base. It can be provided in this case that the bayonet base is formed by a conical outside surface of the objective adaptor which is flattened by two diametrically opposite, mutually parallel flat surfaces, and the bayonet mount is formed by a conical inside surface corresponding to the conical outside surface of the objective adaptor, of the instrument adaptor or of the coupling ring of the instrument adaptor; the conical inside surface having at least one location an interruption with a clear distance which corresponds to the spacing of the flat surfaces of the objective adaptor such that the bayonet base can be pushed laterally through the interruption into the bayonet mount and can be locked in the longitudinal direction by rotation.

If it is provided, moreover that the conical inner surface has similar interruptions at two diametrically opposite locations, the bayonet base can be pushed into the bayonet mount not only laterally, but also longitudinally and be locked in the longitudinal direction by rotation.

In a further refinement of the invention, the bayonet mount has at least one fixing element which can be brought into engagement with the bayonet base. The fixing element can be a knurled-head screw, for example.

It is provided in one advantageous development that on the side opposite the internal thread the objective adapter has an external thread overtopping the bayonet base and corresponding to the external thread of the objective. It is thereby possible, even with the objective adaptor fitted, for the objective to continue to be screwed into the threaded mount usually provided in the transport container, such that these transport containers can further be used to keep the objectives.

BRIEF DESCRIPTION OF THE DRAWING FIGURES

Figure 2:
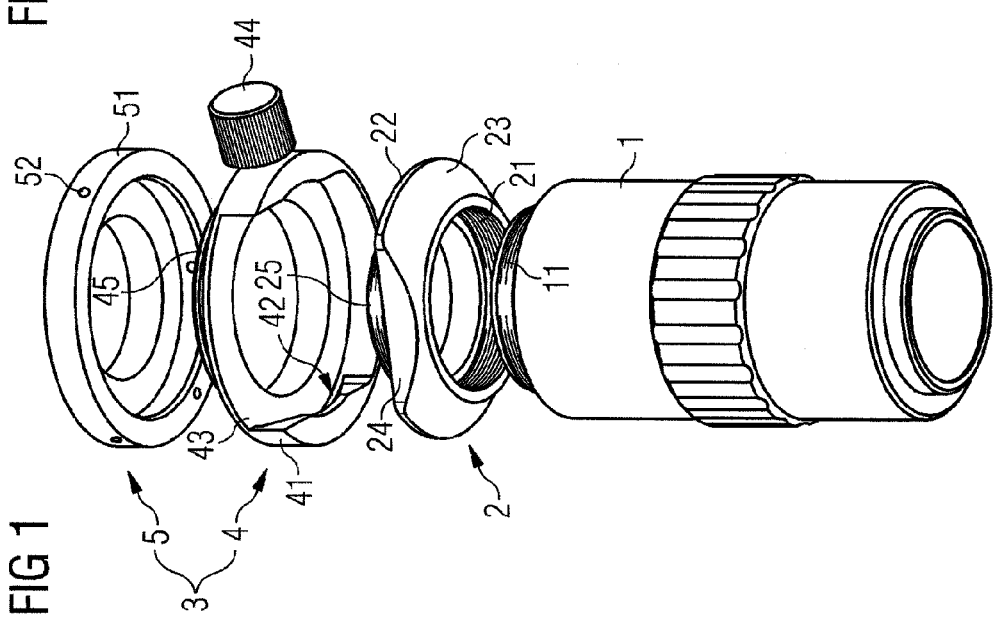

The invention is explained in more detail below with the aid of an exemplary embodiment and associated drawings. In this case, FIGS. 1 and 2 show an exploded illustration of an identical inventive device from different viewing angles.

DETAILED DESCRIPTION

An objective 1 has an external thread 11 that serves for fastening the objective 1 on a corresponding internal thread of an optical instrument. The objective adaptor 2 is illustrated above the objective 1. On its top side, the objective adaptor 2 has a bayonet base 22, and on its underside it has an internal thread 21 that corresponds to the internal thread of the optical instrument and can be connected to the external thread 11 of the objective 1. The bayonet base 22 is formed by a conical outside surface 23 of the objective adaptor 2. This conical outside surface 23 is flattened by two flat surfaces 24 that are diametrically opposite one another and parallel to one another. On its top side, the objective adaptor 2 has an external thread 25 that overtops the bayonet base 22, corresponds to the external thread 11 of the objective 1 and can be used to fasten the objective 1 inside a transport container.

The instrument adaptor 3 is illustrated over the objective adaptor 2. The instrument adaptor 3 comprises a coupling ring 4 and, arranged thereabove a mounting ring 5. On its underside, the coupling ring 4 has the bayonet mount 41 designed for holding the bayonet base 22 of the objective adaptor 2. On its top side, the coupling ring 4 has a base 45 provided for connecting to the mounting ring 5. On its underside the mounting ring 5 arranged over the coupling ring 4 has a mount 51 for holding the base 45 of the coupling ring 4 in a rotatable and fixable fashion, and on its top side it has an external thread 53, corresponding to the external thread 11 of the objective 1 for connection to the optical instrument.

The mounting ring 5 and the coupling ring 4 can be connected to one another such that they can be rotated relative to one another about the longitudinal axis of the instrument adaptor 3 and can be fixed in a selectable position. To this end, the base 45 and the coupling ring 4 can be inserted into the mount 51 of the mounting ring 5 and be locked in the longitudinal direction of the instrument adaptor 3. The lockability is produced by virtue of the fact that the base 45 of the coupling ring 4 has a circumferential groove 46 and the mount 51 of the mounting ring 5 has at least one fixing element 52 that can be brought into engagement with the circumferential groove 46 and is a threaded pin in the exemplary embodiment.

The connection between the instrument adaptor 3 and the objective adaptor 2 is effected by the interaction of the bayonet mount 41 and the bayonet base 22.

The bayonet mount 41 of the coupling ring 4 of the instrument adaptor 3 is formed by a conical inside surface 42 corresponding to the conical outside surface 23 of the objective adaptor 2. The conical inside surface 42 has an interruption 43 whose clear distance corresponds to the spacing of the flat surfaces 24 of the objective adaptor 2. Consequently, the bayonet base 22 can be pushed laterally into the bayonet mount 41 through the interruption 43 in order to lock the longitudinal axis against displacements in the longitudinal direction by rotation of the objective adaptor. The bayonet base 22 can be locked against rotation in the bayonet mount 41 by virtue of the fact that the bayonet mount 41 has a fixing element 44 that can be brought into engagement with the bayonet base 22 and is a knurled head screw in the exemplary embodiment.

The invention claimed is:

1. Device for removably fitting an objective with an external thread on a corresponding internal thread of an optical instrument, comprising an instrument adaptor having at one end an external thread corresponding to the external thread of the objective, and at an other end, a bayonet mount for fixably holding a bayonet base, and further comprising an objective adaptor which has at one end a bayonet base to be connected to the bayonet mount of the instrument adaptor, and at an other end an internal thread corresponding to the internal thread of the optical instrument, wherein the instrument adaptor comprises a mounting ring having the external thread, and a coupling ring having the bayonet mount, the mounting ring and coupling ring being rotatable relative to one another about a longitudinal axis of the instrument adaptor and being fixable in any selectable position relative to one another.

2. Device according to claim 1, wherein, on a side opposite the external thread, the mounting ring has a mount for rotatably and fixably holding a base, and on a side opposite the bayonet mount, the coupling ring has a base which can be inserted into the mount of the mounting ring and can be locked in a longitudinal direction of the instrument adaptor.

3. Device according to claim 2, wherein the base of the coupling ring has a circumferential groove, and the mount of the mounting ring has at least one fixing element to be brought into engagement with the circumferential groove.

4. Device according to claim 3, wherein the bayonet base is formed by a conical outside surface of the objective adaptor which is flattened by two diametrically opposite, mutually parallel flat surfaces, and the bayonet mount is formed by a conical inside surface corresponding to the conical outside surface of the objective adaptor, of the instrument adaptor or of the coupling ring of the instrument adaptor, the conical inside surface having at least one location an interruption with a clear distance which corresponds to spacing of the flat surfaces of the objective adaptor such that the bayonet base can be pushed laterally through the interruption into the bayonet mount and can be locked in the longitudinal direction by rotation.

5. Device according to claim 4, wherein, at two diametrically opposite locations, the conical inside surface has similar interruptions such that the bayonet base is adapted to be pushed longitudinally into the bayonet mount and locked in the longitudinal direction by rotation.

6. Device according to claim 1, wherein the bayonet mount has at least one fixing element which can be brought into engagement with the bayonet base.

7. Device according to claim 1, wherein, on a side opposite the internal thread, the objective adaptor has an external thread overtopping the bayonet base and corresponding to the external thread of the objective.

* * * * *